United States Patent

Chiou

[11] Patent Number: 5,823,578
[45] Date of Patent: Oct. 20, 1998

[54] EXTENSIBLE METALLIC TUBE STRUCTURE

[75] Inventor: Richard Chiou, Tainan, Taiwan

[73] Assignee: Yah-De Co., Ltd., Tainan, Taiwan

[21] Appl. No.: 856,592

[22] Filed: May 15, 1997

[51] Int. Cl.$^6$ ........................................ F16L 35/00
[52] U.S. Cl. .............................. 285/38; 285/298
[58] Field of Search .................... 285/298, 302, 285/322, 323, 38

[56] References Cited

U.S. PATENT DOCUMENTS

| | | | |
|---|---|---|---|
| 1,883,276 | 10/1932 | Zerk | 285/302 X |
| 2,184,358 | 12/1939 | Moore | 285/302 |
| 3,083,041 | 3/1963 | Owenmark | 285/302 X |
| 3,783,178 | 1/1974 | Philibert et al. | 285/302 X |

*Primary Examiner*—Dave W. Arola
*Attorney, Agent, or Firm*—Browdy and Neimark

[57] ABSTRACT

An extensible metallic tube structure has a big hollow tube, an engaging head, a small hollow tube, a locating column, an O-shaped ring, a washer, a C-shaped fixing device, and a controlling sleeve. The big hollow tube having an inwardly indented groove at the upper periphery is engaged with the engaging head at one end. The small hollow tube fixed with locating column is led through the other end of the big hollow tube. In sequence, the O-shaped ring, the washer, the C-shaped fixing device and the controlling sleeve are led through the upper end of the small hollow tube. The controlling sleeve is screwed up to the engaging head via threads. An inner protruding flange defining the other side of the inwardly indented groove of the big hollow tube will prevent the small hollow tube from coming off when it being extended to the extreme. And via the controlling sleeve generating a pushing force when screwed up to the engaging head, the C-shaped fixing device will clamp tightly against the small hollow tube to locate the small hollow tube into position when the tube being adjusted. In addition, the C-shaped fixing means will abut closely against the washer and the washer tightly against O-shaped ring to provide a secure connection of the big and small hollow tubes, so that the water will not flow downwards or leak outwardly at the joint when the big and small hollow tubes are adjusted and uplifted to supply water for cleaning purpose.

1 Claim, 5 Drawing Sheets

EXTENSIBLE METALLIC TUBE STRUCTURE

BACKGROUND OF THE INVENTION

The present invention relates to an extensible metallic tube structure, especially to an extensible tube having an adjustable big and small tubes securely joined together via an engaging head, an O-shaped ring, a washer, a C-shaped fixing means, and a controlling sleeve. The big hollow tube is provided with an inner protruding flange formed by an inwardly indented groove at one end so as to prevent the small hollow tube from coming off when it being extended to the extreme. And via the controlling sleeve generating a pushing force when screwed up to the engaging head by threads, the C-shaped fixing means can locate the small hollow tube into position. In addition, the C-shaped fixing means will abut tightly against the washer and the washer against the O-shaped ring to provide a secure connection of the big and small tubes so that the water will not flow downwards or leak outwardly at the joint when the extensible tube is uplifted to supply water for the purpose of cleaning.

Please refer to FIG. 1. Cleaning is one of the daily household routine. As a rule, one will use either a clout, a brush, or a mop to clean up the dirt or dust. It is quite easy to clear up things or space on a lower ground. Yet, in case of cleaning things and space on a higher ground, it is quite inconvenient and troublesome. One must first climb up to a higher position and then sustain oneself with a water hose as well as a cleaning tool so as to supply oneself with water and cleaning tool for cleaning. It is not only very tiresome to occupy oneself with tools at both hands, it may also be very dangerous since one standing on a higher ground with both hands occupied may easily lose the balance and fall from the higher position.

SUMMARY OF THE PRESENT INVENTION

It is therefore the primary object of the present invention to provide an extensible metallic tube structure having an adjustable big and small hollow tubes securely joined together by an engaging head, an O-shaped ring, a washer, a C-shaped fixing means, and a controlling sleeve; wherein the big hollow tube is provided with an inner protruding flange formed by an inwardly indented groove disposed at one end thereof so as to prevent the small hollow tube from coming off when it being extended to the extreme. Via the controlling sleeve generating a pushing force when screwed up to the engaging head, the C-shaped fixing means can clamp tightly against the small hollow tube and locate the small hollow tube into position. In addition, the C-shaped fixing means will abut tightly against the washer and the washer closely against the O-shaped ring, securely connecting the big and small hollow tubes. Consequently, when the extensible metallic tube of the present invention engaged with a hose and a cleaning tool at both ends respectively is extended and lifted upwardly to supply water for cleaning, the water will not flow downwards and leak outwardly at the joint of the big and small hollow tubes.

BRIEF DESCRIPTION OF THE DRAWINGS

FIG. 3A is a partially enlarged and sectional view of the inwardly indented groove of the big hollow tube of the present invention.

FIG. 3B is a partially enlarged view of the engaging head of the present invention.

FIG. 3C is a partially enlarged and sectional view of the controlling sleeve of the present invention.

DETAILED DESCRIPTION OF THE PREFERRED EMBODIMENT

Figure 1:
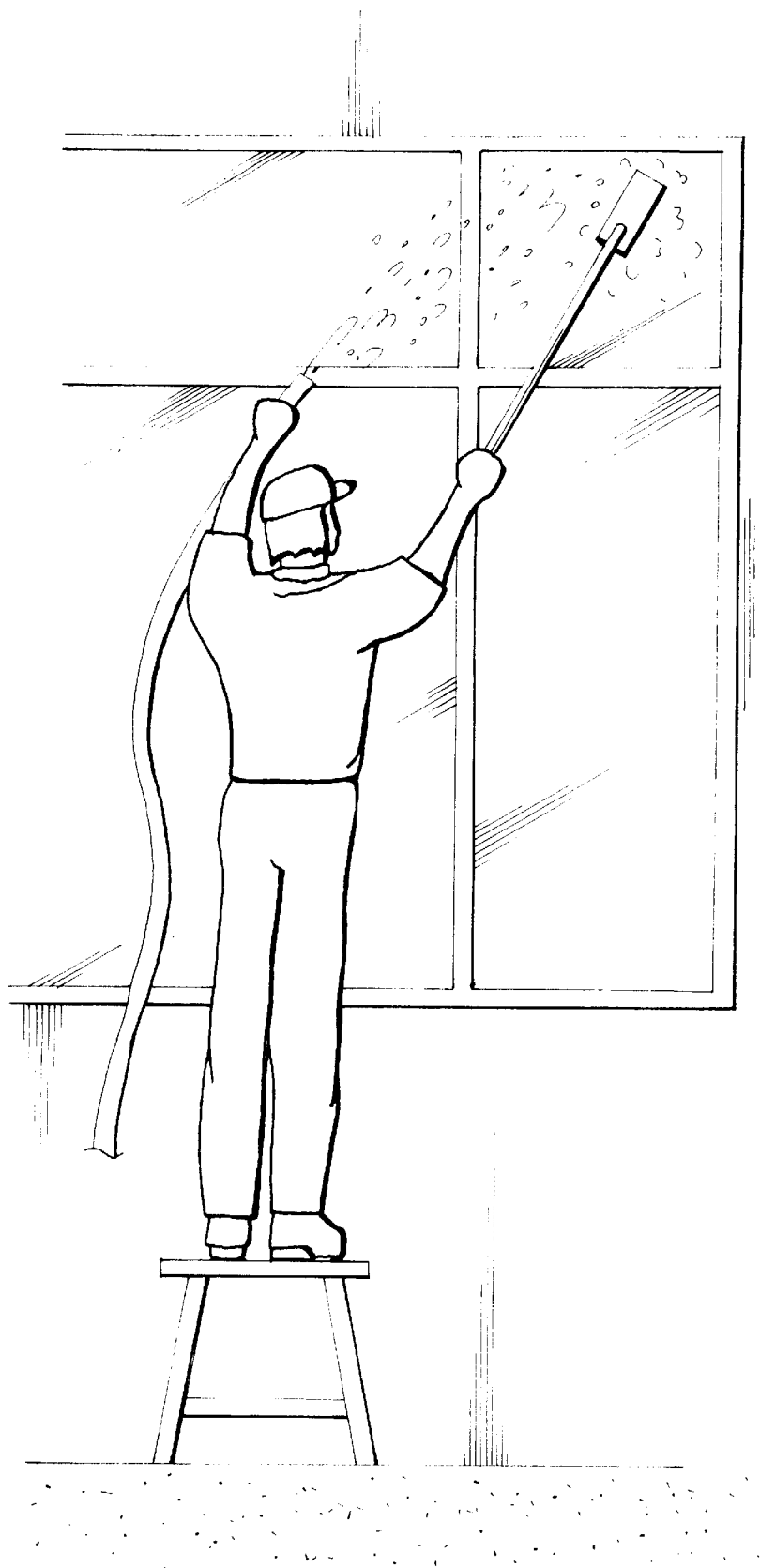
FIG. 1 is a diagram showing the conventional device of cleaning.
Figure 2:
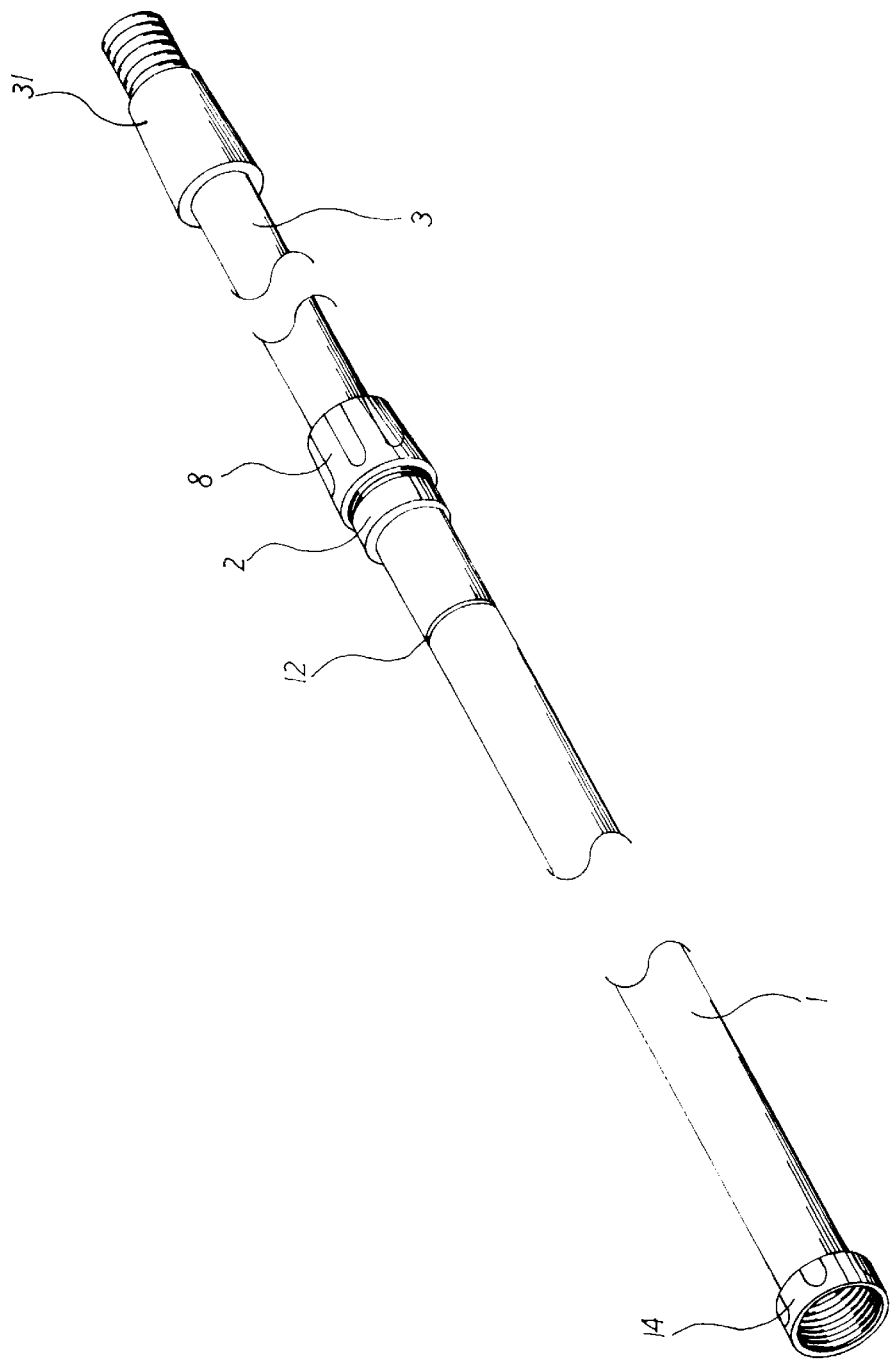
FIG. 2 is an assembled view of the present invention.
Figure 3:
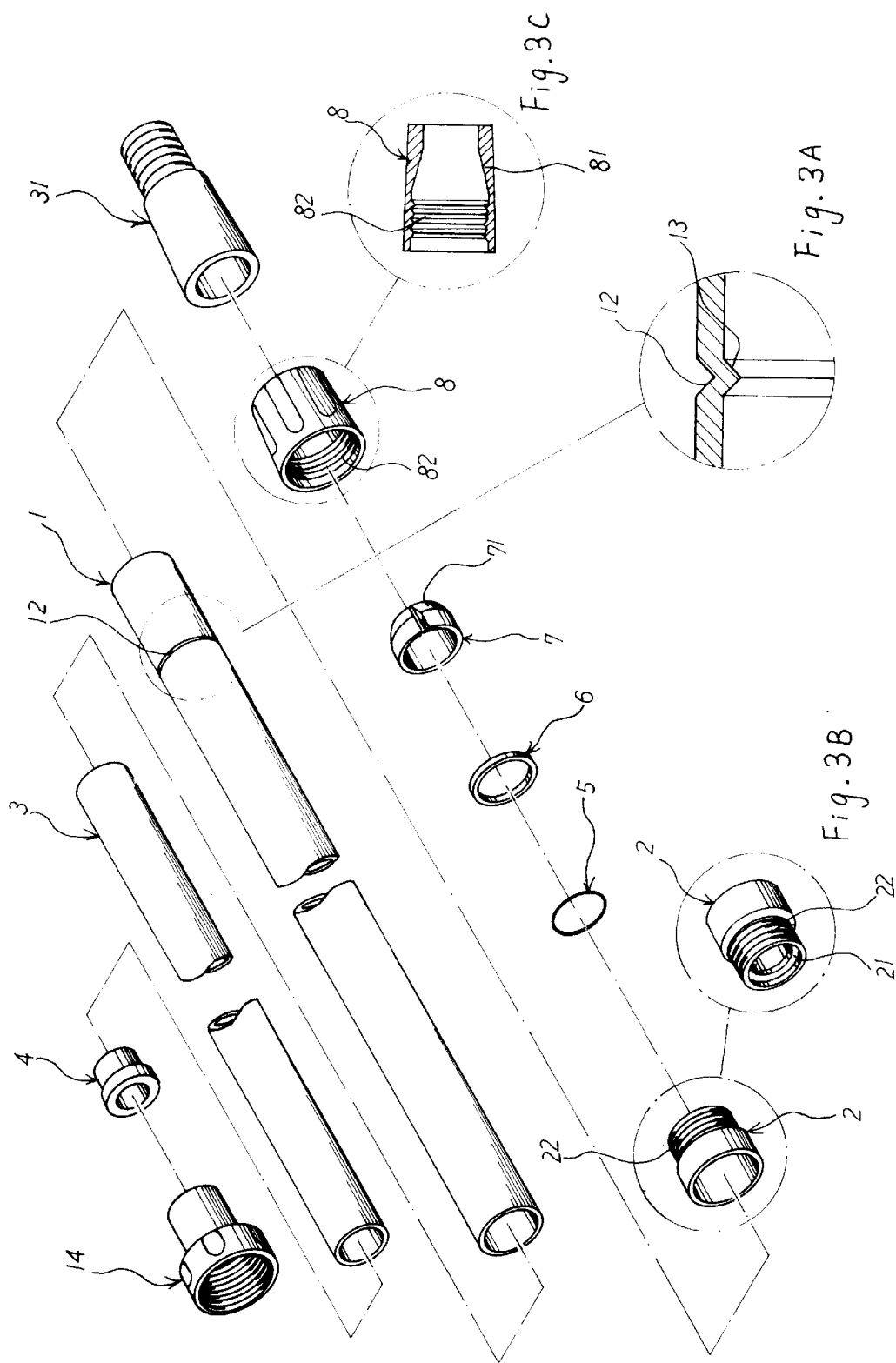
FIG. 3 is an exploded view of the present invention.

Please refer to FIGS. 2, 3, and 3A–C. The present invention relates to an extensible metallic tube, comprising a big hollow tube 1, an engaging head 2, a small hollow tube 3, a locating column 4, an O-shaped ring 5, a washer 6, a C-shaped fixing means 7, and a controlling sleeve 8 as shown in FIG. 2. The big hollow tube 1 is a metallic hollow pipe having an inwardly indented groove 12 disposed at the peripheral surface of the upper end thereof. The inwardly indented groove 12 defines an inner protruding flange 13 disposed at the corresponding inner side of the big hollow tube 1 as shown in FIG. 3A. The engaging head 2 forming a hollow sleeve is provided with a stepped groove 21 at the inner side and with outer threads 22 at the outer side of the front end thereof as shown in FIG. 3B. The locating column 4 is a round hollow sleeve having a two-stage flange disposed at the periphery thereof. The C-shaped fixing means 7 is a C-shaped sleeve having a tapered conic end 71 extending upwardly at the upper part thereof 7. The controlling sleeve 8 is a round hollow sleeve having arched grooves arranged at an interval at the peripheral surface, a tapered conic section 81 diminishing upwardly at the inner front thereof and inner threads 82 defining the inner end thereof as shown in FIG. 3C.

By the above arrangement as shown in FIGS. 3, 3A–C, the extensible metallic tube 1 can be easily assembled. The big hollow tube 1 provided with inwardly indented groove 12 at the upper part is connected with the engaging head 2 at one end. The small hollow tube 3 first engaged with the locating column 4 at one end is then led through the other end of the big hollow tube 1. A hose engaging means 14 is fixedly secured to the bottom end of the big hollow tube 1. In sequence, the O-shaped ring 5, the washer 6, the C-shaped fixing means 7, and the controlling sleeve 8 are led through the upper end of the small hollow tube 3 thereof. The O-shaped ring 5 is located at the stepped groove 21 disposed at the inner side of the engaging head 2, and the controlling sleeve 8 is screwed up to the engaging head 2 by means of the outer thread 22 disposed at the outer side of the engaging head 2 thereof, abutting tightly against the washer 6, and the C-shaped fixing means 7. Finally, a connecting device 31 can be fixedly secured at the upper end of the small hollow tube 3 to accomplish the assembly of the present invention.

Figure 4:
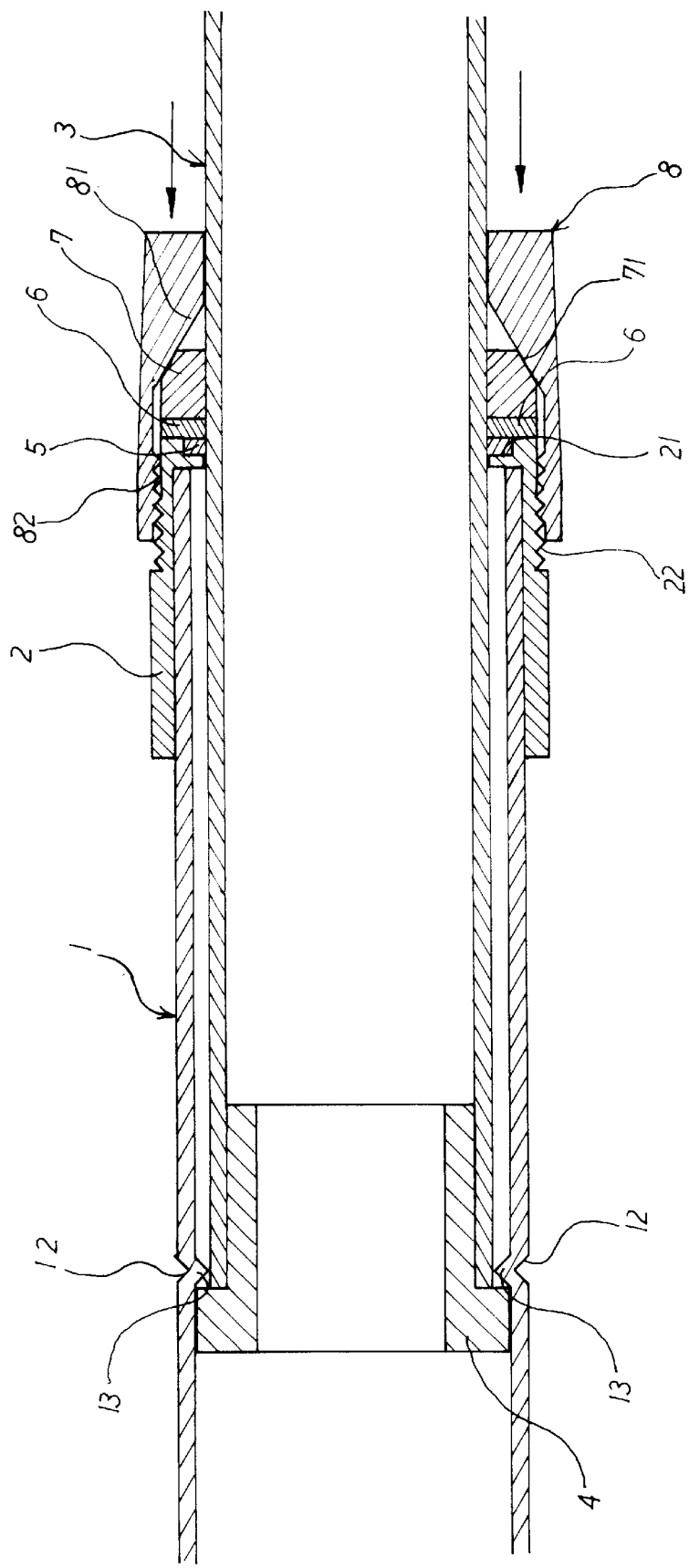
FIG. 4 is a sectional view showing the assembly of the present invention.

Please refer to FIG. 4. In practical use, a hose is connected with the hose connecting means 14 disposed at the bottom end of the big hollow tube 1, and a cleaning tool secured to the connecting device 31 engaged with the upper end of the small hollow tube 3. The controlling sleeve 8 can be loosened from the engaging head 2 so as to adjust the small hollow tube 3 into a proper length for use. When the small hollow tube 3 is extended to the extreme, the two-stage outer flange of the locating column 4 secured to the bottom end of the small hollow tube 3 will be stopped by the inner protruding flange 13 of the big hollow tube 1, preventing the small hollow tube 3 from coming off the big hollow tube 1. The controlling sleeve 8 is then screwed up again to locate the small hollow tube 3 into position. By means of the tapered conic section 81 disposed at the inner front thereof, the controlling sleeve 8 can be tightly abutted against the C-shaped fixing means 7, and the washer 6. The tapered conic section 81 of the controlling sleeve 8 pushes inwardly against the tapered conic end 71 of the C-shaped fixing means 7, and the thrust generated will clamp the C-shaped fixing means 7 tightly against the periphery of the small hollow tube 3 so as to locate the small hollow tube 3 into position. In addition, the pushing force of the controlling sleeve 8 will abut the C-shaped fixing means 7 tightly against the washer 6 and the washer 6 tightly against the O-shaped ring 5 located at the stepped groove 21 of the engaging head 2 in turn. Consequently, the connection of the big and small hollow tubes 1, 3 is securely and tightly joined as shown in FIG. 4.

Figure 5:
FIG. 5 is a diagram showing the present invention in practical use.

Please refer to FIG. 5. The extensible metallic tube of the present invention can be easily extended and safely lifted high up when in use. Due to the secure connection of the big and small hollow tubes 1, 3, the water will not flow downwards and leak outwardly at the joint when the tube of the present invention is uplifted to supply water for cleaning purpose.

What is claimed is:

1. An extensible metallic tube, comprising a big hollow tube, an engaging head, a small hollow tube, a locating column, an O-shaped ring, a washer, a C-shaped fixing means, and a controlling sleeve; wherein, the big hollow tube is a metallic hollow pipe, having an inwardly indented groove disposed at the upper peripheral surface and an inner protruding flange disposed at the corresponding inner side thereof;

the engaging head forming a hollow sleeve is provided with a stepped groove at the inner front and outer threads at the outer front thereof;

the locating column is a round hollow sleeve, having flange disposed at the outer surface;

the C-shaped fixing means is a C-shaped sleeve and is provided with a tapered conic end at the upper side;

the controlling sleeve is a round hollow sleeve having arched grooves arranged at an interval at the outer periphery thereof, and a tapered conic section at the inner front and inner threads at the inner end thereof;

whereby, the upper end of the big hollow tube is connected with the engaging head and the small hollow tube is connected with the locating column and is led through the other end of the big hollow tube; a hose engaging device is fixed to the bottom end of the big hollow tube, and in sequence, the O-shaped ring, the washer, the C-shaped fixing means, and the controlling sleeve are passed over, the upper end of the small hollow tube thereof wherein the O-shaped ring being located at the stepped groove of the engaging head and the controlling sleeve being screwed onto the engaging head via the outer threads of the engaging head; and a connecting device is fixed to the upper end of the small hollow tube for the connection of tools;

the extensible metallic tube can be adjusted into a proper length by means of the controlling sleeve; wherein the inner protruding flange of the big hollow tube will engage the flange of the locating column to prevent the small hollow tube from coming out of said big hollow tube when the small hollow tube is extended to the extreme, and the controlling sleeve tapered conic section matches the tapered conic end of the C-shaped fixing means and will push inwardly against the C-shaped fixing means, clamping said fixing means tightly against the periphery of the small hollow tube so as to locate said tube into position; the thrust generated by the controlling sleeve will abut the C-shaped fixing means tightly against the washer and the washer closely against the O-shaped ring located at the stepped groove of the engaging head to provide a tightly and closely secured connection of the big and small hollow tubes, so that the water will not flow downwards and leak outwardly at the joint when the tube is uplifted to supply water for cleaning purpose.

* * * * *